United States Patent [19]

Katoh et al.

[11] Patent Number: 4,755,891
[45] Date of Patent: Jul. 5, 1988

[54] CIRCUIT FOR PROCESSING WAVEFORM OF REPRODUCED SIGNAL IN MAGNETIC REPRODUCING APPARATUS

[75] Inventors: Yasuhiro Katoh, Tokyo; Fumio Kugiya, Hachiouji; Hajime Aoi, Tachikawa, all of Japan

[73] Assignee: Hitachi, Ltd., Tokyo, Japan

[21] Appl. No.: 898,212

[22] Filed: Aug. 20, 1986

[30] Foreign Application Priority Data

Sep. 13, 1985 [JP] Japan ................ 60-201540

[51] Int. Cl.⁴ ............... G11B 5/09; G11B 5/102; G11B 5/23
[52] U.S. Cl. .................... 360/46; 360/67; 360/119
[58] Field of Search ............ 360/46, 67, 119

[56] References Cited

U.S. PATENT DOCUMENTS 4,385,328 5/1983 Tanaka .................. 360/46
4,591,939 5/1986 Sakuma et al. .......... 360/46

Primary Examiner—Vincent P. Canney
Attorney, Agent, or Firm—Antonelli, Terry & Wands

[57] ABSTRACT

In a waveform processing circuit comprising a delay line for delaying a signal outputted from a ring type magnetic head reproducing a perpendicular magnetization recording, an attenuator for attenuating the signal delivered out of the ring type magnetic head, and a differential amplifier for receiving outputs from the delay line and the attenuator, wherein a waveform of the signal is processed to discriminate a position of magnetization transition based on the waveform of the signal; the delay time $\tau$ of the delay line is selected to satisfy $$v \cdot \tau \leq g$$

where, v is a relative speed between the recording medium and the magnetic head and g indicates the gap length of the magnetic head.

1 Claim, 4 Drawing Sheets

(PRIOR ART) SIGNAL 1

(PRIOR ART) SIGNAL 2

(PRIOR ART) SIGNAL 3

(PRIOR ART) SIGNAL 4

| COMBINATION | Hc (Oe) | Mr/Ms | GAP LENGTH OF RING HEAD (μm) |
|---|---|---|---|
| I | 790 | 0.203 | 0.20 |
| II | 1000 | 0.250 | 0.27 |
| III | 502 | 0.190 | 0.35 |

CIRCUIT FOR PROCESSING WAVEFORM OF REPRODUCED SIGNAL IN MAGNETIC REPRODUCING APPARATUS

BACKGROUND OF THE INVENTION

The present invention relates to a magnetic reproducing apparatus for reproducing by use of a ring type magnetic head a digital signal recorded on a perpendicular magnetic recording medium.

The perpendicular magnetic recording method is a method for recording information by magnetizing a recording medium in a direction of thickness thereof and is expected to be applied to a high density digital recording storage.

With a ring type magnetic head (to be simply referred to as a ring head herebelow) used as a magnetic recording and reproducing head in the perpendicular magnetic recording method, a waveform of FIG. 2B is obtained when information at an isolated magnetization transition is reproduced, where the waveform has asymmetric positive and negative peaks (to be referred to as isolated waveshape herebelow). As a method for discriminating a position of magnetization transition from such a waveform, a method for processing a waveform of a reproduced signal has already been proposed by the inventors of the present invention and the coinventors (Japanese Patent Application Laid Open No. 60-150,316). That is, as shown in FIG. 2A, a reproduced signal 1 outputted from a ring head is delayed by a delay line 5, the resultant delayed signal 2 and a signal 3 obtained by adjusting the amplitude of the reproduced signal 1 by use of an attenuator 6 are amplified by a differential amplifier 23 so that these signals are overlapped with a time difference therebetween, the difference being equal to a time interval between the positive and negative peaks of the isolated waveshape, thereby producing a signal 4 in which the asymmetry has been removed. A zero-cross point of the signal 4 is detected as a magnetization transition.

In a digital recording storage, to effect a highly accurate information reproduction, a timing jitter must be essentially minimized in the pulse reproduced at magnetization transition; however, this has not been fully considered in the prior art technique.

SUMMARY OF THE INVENTION

It is therefore an object of the present invention to provide a magnetic reproducing apparatus which can effect a highly accurate information reproduction and is suitable for a perpendicular magnetic recording system using a perpendicular magnetic recording medium and a ring head.

To this end, according to the present invention, a constant of the delay element in the waveform processing circuit is selected as follows:

$$\tau \cdot v \leq g$$

where, v is the relative speed of the recording medium with respect to the ring head and g indicates the gap length of the ring head. The constant is selected in this fashion for the following reasons.

In general, the perpendicular magnetic recording method using a ring head has a reproduction characteristic as shown by a solid line curve B in FIG. 3, namely, a voltage reproduced by the ring head takes the minimum value when the recording wavelength $\lambda$ satisfies the condition of $\lambda_g = g$. Since a range between line C and line D associated with the reproduction characteristic of FIG. 3 is used for the recording and reproducing in an ordinary digital magnetic recording and reproducing apparatus, it is desirable to increase the voltage in this range to the maximum extent. On the other hand, the transfer function H ($\omega$) of the waveform processing circuit of FIG. 2A is represented as:

$$H(\omega) = \{(1+K^2) - 2K \cos(\omega\tau)\}^{\frac{1}{2}}$$

where, K is the attenuation factor of the attenuator 6. In FIG. 3, the transfer function is indicated by a dotted line curve A. As can be seen from the curve A, the transfer function has a dip E at a point of $\lambda_T = v \cdot \tau$. As a consequence, for $\lambda_T = \lambda_g$ (note that the recording wavelength values are arranged in the descending order along the axis of recording wavelength), the reproduced voltage in the range C-D for recording and reproducing is lowered, which leads to deterioration of the resolution and the Signal-to-Noise Ratio (SNR) and hence causes the timing jitter of a pulse reproduced at magnetization transition to increase. Consequently, to set $\lambda_T$ to a position on the right of D as shown in FIG. 3, namely, to achieve a highly accurate information reproduction, the constant of the delay element must be selected to satisfy $\lambda_T \leq \lambda_g$ or $v \cdot \tau \leq g$. Even if $\lambda_T$ is set to a position on the left of line C in the figure, dips (not shown) are generated on the right of the dip E and in the range C-D, and therefore the highly accurate information reproduction cannot be easily implemented.

BRIEF DESCRIPTION OF THE DRAWINGS

The present invention will be apparent from the following detailed description taken in conjunction with the accompanyiny drawings in which.

DETAILED DESCRIPTION OF THE PREFERRED EMBODIMENT

Figure 1A:
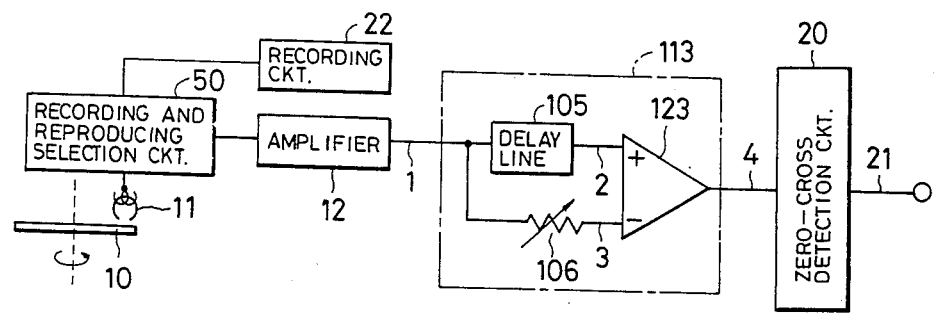
FIG. 1A is a schematic diagram illustrating an embodiment of the present invention.
Figure 1B:
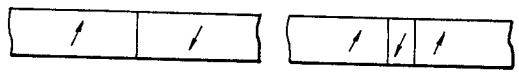
FIG. 1B is a simplified diagram showing the perpendicular magnetization of a recording medium in the embodiment.
Figure 1C:
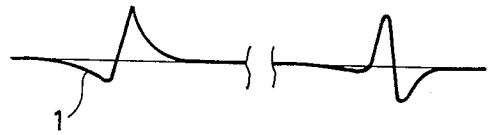
FIGS. 1C–1E are graphs depicting signal waveforms at the respective positions of the embodiment.
Figure 1D:
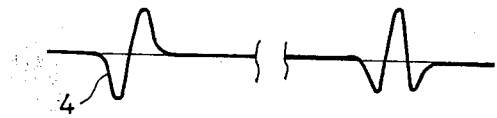
Figure 1E:
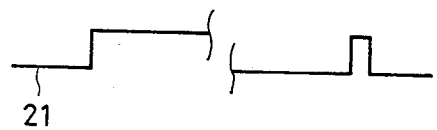
Figure 2A:
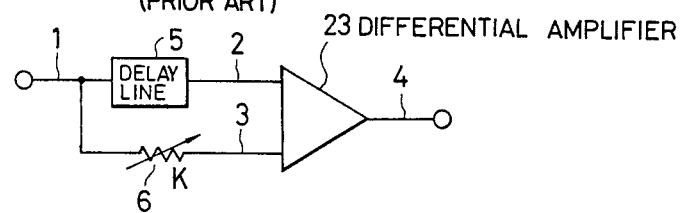
FIG. 2A is a schematic circuit diagram illustrating the waveform processing circuit proposed previously.
Figure 2B:
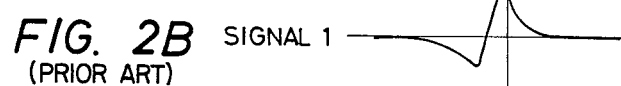
FIGS. 2B–2E are graphs showing signal waveforms at the respective positions of the circuit of FIG. 2A.
Figure 2C:
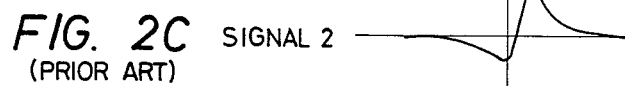
Figure 2D:
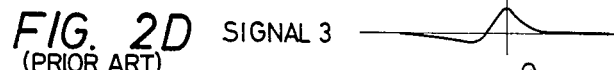
Figure 2E:
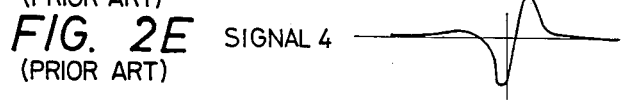
Figure 3:
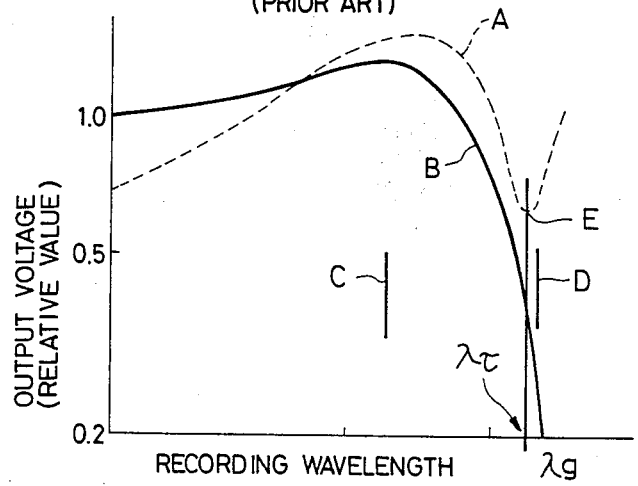
FIG. 3 is a graph demonstrating a transfer function (dotted line curve) of the waveform processing circuit of FIG. 2A and the reproduction characteristic (solid line curve) of a ring head.
Figures 4, 5:
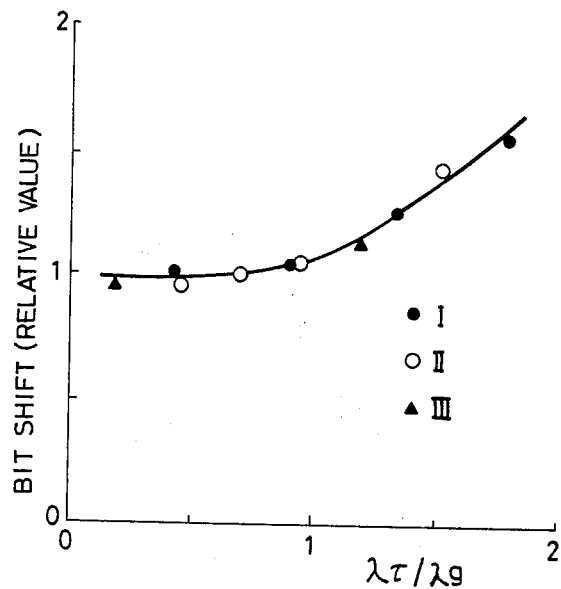
FIG. 4 is a schematic diagram showing the characteristic values of the recording medium and the ring head used in combination.
FIG. 5 is a graph illustrating the relationships between the bit shift and $\lambda_{96}/\lambda_g$.
Figure 6:
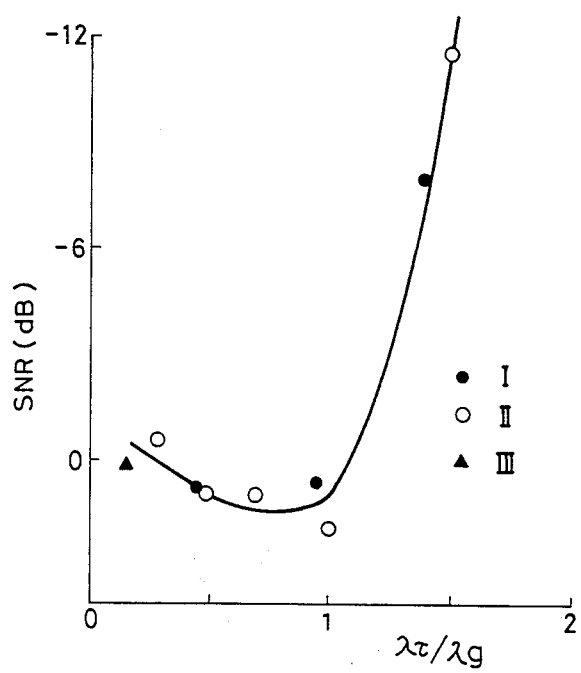
FIG. 6 is a graph illustrating the relationships between the SNR and $\lambda_T/\lambda_g$.

An embodiment of the present invention will be described with reference to FIGS. 1A–1E. FIG. 1A is a schematic circuit diagram in which the present invention is applied to a 5.25 inch high density floppy disk drive using a Co-Cr single layer magnetic recording medium and a ring head. A ring head 11 is connected via a recording and reproducing selection circuit 50 to a recording circuit 22 or an amplifier 12. When recording information, the ring head 11 is connected to the recording circuit 22 to effect a perpendicular magnetic recording of the information on the Co-Cr single layer magnetic recording medium 10 (FIG. 1B). During information reproduction, the ring head 11 is connected to the amplifier 12 so as to supply the signal 1 reproduced by the ring head 11 to a waveform processing circuit 113 via the amplifier 12 (FIG. 1C). The waveform processing circuit 113 corrects the asymmetry existing in the signal reproduced by the ring head 11, thereby producing a corrected signal 4 (FIG. 1D). A zero-cross detection circuit 20 processes the signal 4 to generate a reproduced pulse 21 at magnetization transition by use of the zero-cross point of the waveform of the signal 4 (FIG. 1E). Prior art circuits may be used for the recording and reproducing selection circuit 50, the recording circuit 22, and the amplifier 12. The waveform processing circuit 113 comprises a delay line 105, an attenuator 106, and a differential amplifier 123. In this embodiment, a delay line for logic circuits is used as the delay line 105, a resistive dividing network is adopted as the attenuator 106, and an operational amplifier is utilized as the differential amplifier 123. When a delay line for logic circuits is used as the delay line 105, it is desired that the output of the amplifier 12 develops a low impedance like an emitter follower output. The waveform processing circuit 113 may be configured to be integrated in the amplifier 12. With the Co-Cr single layer recording medium of FIG. 4, the timing jitter of the pulse reproduced at magnetization transition has been measured for D$_{50}$ values of various combinations (D$_{50}$=Recording density at which the voltage reproduced by the ring head is 50% of the voltage for the low density) with the relative speed set as v=2.2 ms$^{-1}$, thereby investigating the effect of the delay constant $\tau$ of the waveform processing circuit. In FIG. 4, H$_c$ and M$_r$/M$_S$ indicate the coercivity of perpendicular direction and the squareness of perpendicular direction, respectively. FIG. 5 is a graph illustrating the effect of $\tau$ on a shift with respect to time of pulse position (called a bit shift) of the pulse reproduced at magnetization transition. The bit shift is represented in this figure as a relative value in a case where a two-bit signal is recorded and the peak detection is conducted under an ideal condition (namely, the signal 1 reproduced by the ring head is not passed through the waveform processing circuit having a problem associated with the SNR and the peak shift) and the interval between the peaks of the waveform of the reproduced signal 1 is observed by an oscilloscope). FIG. 6 is a graph depicting the effect on the SNR as relationships by use of the relative value with respect to the SNR at an input point of the waveform processing. As can be seen from FIGS. 5 and 6, the relative bit shift=1 and the relative SNR=OdB when $\lambda_T/\lambda_g$ is at most one. For example, if $\lambda_T$ is selected to satisfy $\lambda_T=v\cdot\tau\leq\lambda_g=0.27$, namely, $\tau\leq 120$ ns in the case of recording and reproducing system using the combination II of FIG. 4, the bit shift and the SNR are not deteriorated. It can also be seen that even in the recording and reproducing systems using the combinations I and III of FIG. 4 in which the ring head has the different gap lengths, the deterioration of the bit shift and SNR can be prevented by selecting $\tau$ to satisfy $\lambda_T\leq\lambda_g$.

According to the present invention, the timing jitter of the pulse reproduced at magnetization transition can be minimized, which enables a highly accurate information reproduction in a perpendicular magnetic recording system using a perpendicular magnetic recording medium and a ring head.

What is claimed is:

1. A circuit for receiving a signal delivered out of a ring head having a gap of a predetermined length and reproducing magnetization of a perpendicular magnetization recording medium, and for processing a waveform of the signal to discriminate a position of mangetization transition based on the waveform of the signal comprising:

delay means for delaying said signal by a predetermined period of time;

adjust means for adjusting an amplitude of said signal; and a differential amplifier for receiving as input signals an output from said delay means and an output from said adjust means, wherein the delay time $\tau$ of said delay means is selected to satisfy $$v\cdot\tau\leq g$$

where, v is a relative speed between said recording medium and said magnetic head and g indicates the gap length of said magnetic head.

* * * * *